United States Patent
Park et al.

(10) Patent No.: US 10,442,928 B2
(45) Date of Patent: Oct. 15, 2019

(54) POLYAMIDE 6 RESINS CONTAINING A LOW LEVEL OF POLYAMIDE 66 COMONOMER

(71) Applicant: AdvanSix Resins & Chemicals LLC, Parsippany, NJ (US)

(72) Inventors: Kuil Park, Midlothian, VA (US); Simon J. Porter, Chesterfield, VA (US); Stephanie C. Barthe, Richmond, VA (US); Haoyu Liu, Midlothian, VA (US); Veera Nelliappan, Richmond, VA (US)

(73) Assignee: AdvanSix Resins & Chemicals LLC, Parsippany, NJ (US)

( * ) Notice: Subject to any disclaimer, the term of this patent is extended or adjusted under 35 U.S.C. 154(b) by 0 days.

(21) Appl. No.: 15/650,407

(22) Filed: Jul. 14, 2017

(65) Prior Publication Data

US 2018/0030271 A1   Feb. 1, 2018

Related U.S. Application Data

(60) Provisional application No. 62/434,698, filed on Dec. 15, 2016, provisional application No. 62/367,753, filed on Jul. 28, 2016.

(51) Int. Cl.

| | | |
|---|---|---|
| *C08L 77/02* | (2006.01) | |
| *C08G 69/14* | (2006.01) | |
| *C08L 23/08* | (2006.01) | |
| *C08L 51/06* | (2006.01) | |
| *B32B 27/32* | (2006.01) | |
| *B32B 27/34* | (2006.01) | |
| *C08J 5/18* | (2006.01) | |
| *C08G 69/36* | (2006.01) | |
| *B29C 48/10* | (2019.01) | |
| *B29C 48/18* | (2019.01) | |
| *B29K 77/00* | (2006.01) | |
| *B29K 105/00* | (2006.01) | |
| *C08L 77/06* | (2006.01) | |
| *B29C 48/00* | (2019.01) | |

(52) U.S. Cl.
CPC .............. *C08L 77/02* (2013.01); *B29C 48/10* (2019.02); *B29C 48/18* (2019.02); *B32B 27/32* (2013.01); *B32B 27/34* (2013.01); *C08G 69/14* (2013.01); *C08G 69/36* (2013.01); *C08J 5/18* (2013.01); *C08L 23/0876* (2013.01); *C08L 51/06* (2013.01); *B29C 48/0018* (2019.02); *B29C 48/0019* (2019.02); *B29C 48/022* (2019.02); *B29C 48/185* (2019.02); *B29K 2023/06* (2013.01); *B29K 2077/00* (2013.01); *B29K 2105/0085* (2013.01); *C08J 2377/06* (2013.01); *C08L 77/06* (2013.01)

(58) Field of Classification Search
None
See application file for complete search history.

(56) References Cited

U.S. PATENT DOCUMENTS

| | | | |
|---|---|---|---|
| 4,556,696 A * | 12/1985 | Stewart | .................. C08J 5/18 |
| | | | 264/514 |
| 6,040,392 A | 3/2000 | Khanna et al. | |
| 9,200,115 B2 | 12/2015 | Plachetta et al. | |
| 2007/0026250 A1 | 2/2007 | Hofmeister et al. | |

FOREIGN PATENT DOCUMENTS

| | | |
|---|---|---|
| DE | 4438546 A1 | 5/1996 |
| JP | H07117 B2 | 10/1991 |
| JP | 4525289 B2 | 4/2006 |
| JP | 10146900 A | 6/2016 |
| WO | 2015114017 A1 | 8/2015 |

OTHER PUBLICATIONS

DE 4438546 (A1) machine translation.*
Franck, A. and TA Instruments Germany. "Creep Recovery Measurements of Polymers." AAN022, presented at the 77th Annual Meeting of the American Society of Rheology in Vancouver, BC, 2005, pp. 1 AAN022e-7 AAN022e.
Franck, A.J.P. "A Rheometer for Characterizing Polymer Melts and Suspensions in Shear Creep and Recovery Experiments," Journal of Rheology 29:833-850, 1985.
International Search Report and Written Opinion issued in PCT/US2017/042160, dated Oct. 13, 2017, 14 pages.
Kricheldorf, H.R., et. al. "Chapter 1: Interchange Reactions in Condensation Polymers and Their Analysis by NMR Spectroscopy." in: Fakirov, Stoyko, Transreactions in Condensations (Weinheim, Wiley-VCH Verlag GmbH, 1999), pp. 1-78.
Seavey, Kevin C.; et al. "A New Phase-Equilibrium Model for Simulating Industrial Nylon-6 Production Trains." Ind. Eng. Chem. Res. 42:3900-3913, 2003.

* cited by examiner

Primary Examiner — Ana L. Woodward
(74) Attorney, Agent, or Firm — Faegre Baker Daniels LLP (57) ABSTRACT

Compositions of polyamide resins containing a low level of polyamide 66 comonomer are provided, which are useful in producing blown films. A method of forming a blown film includes: extruding a polyamide copolymer to form a polyamide film. The polyamide copolymer is formed from a mixture of caprolactam and hexamethylenediamine adipate where the caprolactam comprises from 85 mol. % to 99 mol. % of the total moles of caprolactam and hexamethylenediamine adipate.

21 Claims, 10 Drawing Sheets

POLYAMIDE 6 RESINS CONTAINING A LOW LEVEL OF POLYAMIDE 66 COMONOMER

CROSS-REFERENCE TO RELATED APPLICATIONS

This application claims the benefit under Title 35, U.S.C. § 119(e) of U.S. Provisional Patent Application Ser. No. 62/434,698, filed on Dec. 15, 2016, entitled POLYAMIDE 6 RESINS CONTAINING A LOW LEVEL OF POLYAMIDE 66 COMONOMER, and U.S. Provisional Patent Application Ser. No. 62/367,753, filed on Jul. 28, 2016, entitled POLYAMIDE 6 RESINS CONTAINING A LOW LEVEL OF POLYAMIDE 66 COMONOMER, the disclosures of each are expressly incorporated herein in their entireties.

FIELD

The present invention relates to polyamide materials, and in particular, to copolymers of polyamide 6 with polyamide 66 which are useful in blown film applications.

BACKGROUND

Multilayer, coextruded blown film is used in flexible packaging applications. Typical films include multiple layers formed from different polymers, such as one or more of a polyamide layer, a polyethylene layer, a layer formed from ethylene vinyl alcohol (EVOH) as an oxygen barrier, a layer formed from polyolefins for moisture resistance, and/or one or more tie layers, such as layers formed from anhydride modified ethylene acrylate resins and maleic anhydride grafted polyethylene.

Polyamides, such as polyamide 6 (PA6) may be included in typical films, providing good barrier properties and mechanical strength. However, the relatively high crystallization rate of PA 6 can limit the processing window and cause problems such as curling in unsymmetrical film structures.

Commercially available copolymers of polyamide 6 and polyamide 6,66 (PA 6/66) such as Ultramid C40 from BASF typically have lower melting points and correspondingly lower crystallization rates. For some blown film processes, it may be desirable to have slightly higher melting points and low crystallization rates, or very low crystallization rates with higher melting points.

Some coextruded blown film processes employ blends of PA6 with a polyamide 6/66 copolymer or an amorphous polyamide such as Selar® PA3426 to provide blends having more favorable crystallization rates. However, the such polyamides must be compatible with each other, and/or must efficiently trans-amidate during extrusion. Moreover, the blending of resins prior to extrusion increases the time and expense of the process. Additionally, consistent uniformity of the blend is difficult to achieve, leading to variations in the finished product quality.

Improvements in the foregoing processes are desired.

SUMMARY

The present disclosure provides compositions of polyamide resins containing a low level of polyamide 66 comonomer, which is useful in producing blown films, for example.

A method of forming a blown film is provided. The method includes extruding a polyamide copolymer to form a polyamide film. The polyamide copolymer is formed from a mixture of caprolactam and hexamethylenediamine adipate. The caprolactam comprises from 85 mol. % to 99 mol. % of the total moles of caprolactam and hexamethylenediamine adipate. In a more particular form, the caprolactam comprises from 90 mol. % to 99 mol. %, or even more particularly, from 92 mol. % to 96 mol. %, of the total moles of caprolactam and hexamethylenediamine adipate. In another more particular form, the mixture of caprolactam and hexamethylenediamine adipate further comprises water. In still another more particular form, the polyamide copolymer is formed by polymerizing the mixture of caprolactam and hexamethylenediamine adipate in a continuous polymerization train.

In a more particular form, the method further includes extruding a polyethylene polymer to form a polyethylene film, and combining the polyamide film and polyethylene film to form a multilayer film. In a more particular form, extruding the polyamide copolymer includes forming a bubble in the extruded polyamide copolymer by injecting air through an injection port and gathering the extruded polyamide copolymer with one or more rollers into the polyamide film.

In a more particular form, the polyamide copolymer has a crystallization temperature of 140° C. to 160° C. In another more particular embodiment, the polyamide copolymer has a melt point of 190° C. to 210° C. In still another more particular form, the polyamide copolymer has an isothermal crystallization time of 1.25 min to 12 min at 170° C. In still another more particular form, the polyamide copolymer has an isothermal crystallization time of 1.0 min to 14 min at 170° C. In still another more particular form, the polyamide copolymer has a degree of randomness of 0.95 to 1.1. In another more particular form, the polyamide copolymer has a puncture resistance of 55 in-lb$_f$ to 95 in-lb$_f$.

A blown film including a polyamide layer is provided. The polyamide layer includes a polyamide copolymer formed from a mixture of caprolactam and hexamethylenediamine adipate. The caprolactam comprises from 85 mol. % to 99 mol. % of the total moles of caprolactam and hexamethylenediamine adipate. In a more particular form, the caprolactam comprises from 90 mol. % to 99 mol. %, or even more particularly, from 92 mol. % to 96 mol. %, of the total moles of caprolactam and hexamethylenediamine adipate.

In a more particular form, the polyamide copolymer has a crystallization temperature of 140° C. to 170° C. In another more particular form, the polyamide copolymer has a crystallization temperature of 140° C. to 160° C. In still another more particular form, the polyamide copolymer has a melt point of 190° C. to 210° C. In yet still another more particular form, the polyamide copolymer has an isothermal crystallization time of 1.25 min to 12 min at 170° C. In a more particular form, the film further comprises a polyethylene layer. In another more particular form, the polyamide copolymer has a degree of randomness between 0.95 to 1.1. In another more particular form, the polyamide copolymer has a puncture resistance of 55 in-lb$_f$ to 95 in-lb$_f$.

A polyamide copolymer is provided. The copolymer is formed from a mixture of caprolactam and hexamethylenediamine adipate, wherein the caprolactam comprises from 85 mol. % to 99 mol. % of the total moles of caprolactam and hexamethylenediamine adipate, and the copolymer has a melt point of 190° C. to 205° C. In a more particular form, the copolymer has a degree of randomness of 0.95 to 1.1. In yet still another more particular form, the polyamide copolymer has a residual wall thickness of 85% to 97%. In another more particular form, the copolymer has a puncture resistance of 55 in-lb$_f$ to 95 in-lb$_f$.

BRIEF DESCRIPTION OF THE DRAWINGS

The above mentioned and other features of the invention, and the manner of attaining them, will become more apparent and the invention itself will be better understood by reference to the following description of embodiments of the invention taken in conjunction with the accompanying drawings.

Corresponding reference characters indicate corresponding parts throughout the several views. Although the drawings represent embodiments of various features and components according to the present disclosure, the drawings are not necessarily to scale and certain features may be exaggerated in order to better illustrate and explain the present disclosure. The exemplifications set out herein illustrate one or more embodiment of the invention, and such exemplifications are not to be construed as limiting the scope of the invention in any manner.

DETAILED DESCRIPTION

Figure 1:
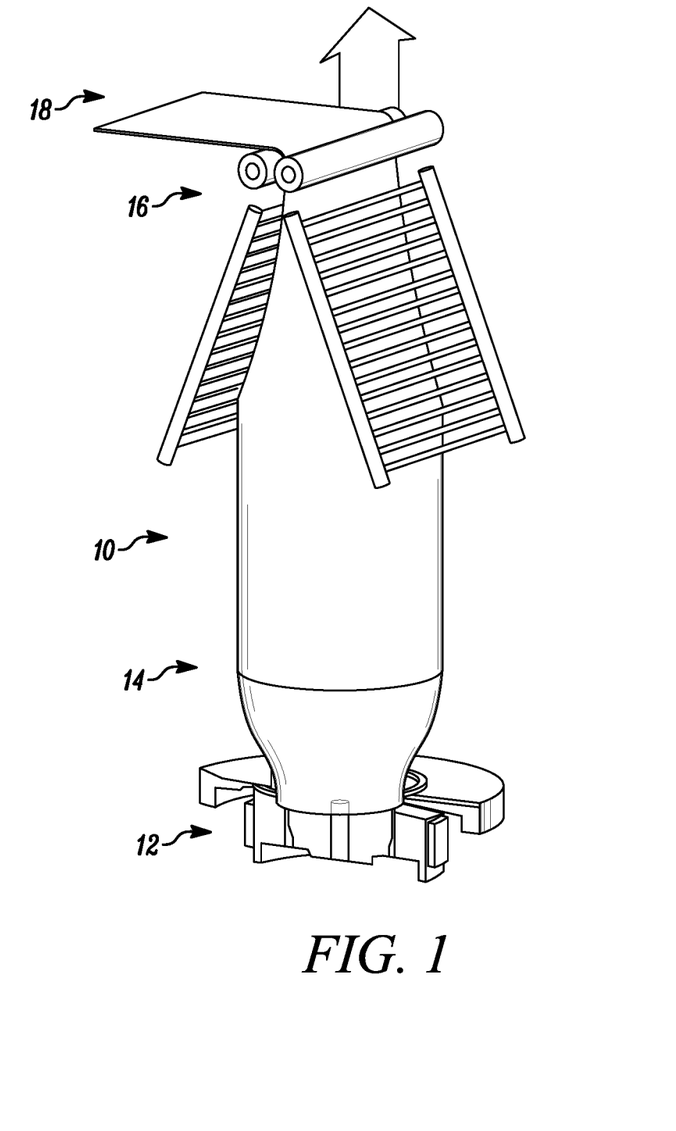
FIG. 1 illustrates an exemplary system for producing a blown film.

Referring first to FIG. 1, an exemplary blown film process bubble 10 is illustrated. As illustrated in FIG. 1, the molten polymer exits a die of extruder 12 and begins to cool. The frost line 14 indicates the point at which the molten polymer solidifies. A bubble 10 is formed between the extruder and the rollers 16 due to the injection of air through an injection port (not shown) in the extruder 12. Rollers 16 gather the film in bubble 10 into a continuous film 18. As indicated, it is desirable to utilize a polymer providing a higher frost line 14, in turn providing a stable bubble 10 and/or little to no wrinkling in forming the film 18. As discussed below, the particular polymer formed according to the present disclosure provides a desirable lengthened crystallization time.

Figure 2A:
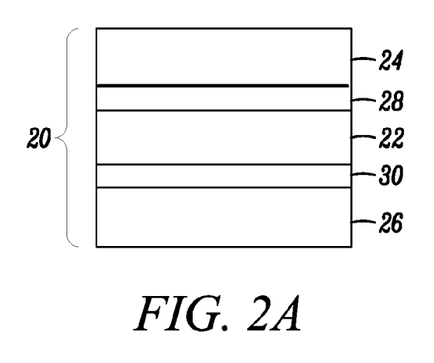
FIGS. 2A-2C illustrate exemplary multi-layer films.
Figure 2B:
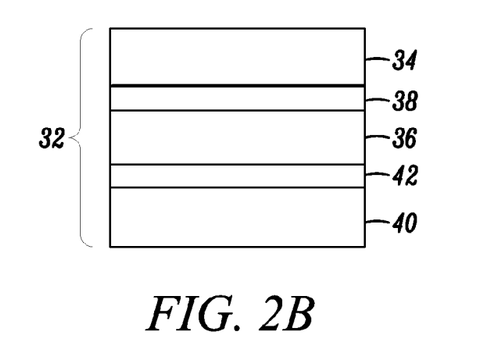
Figure 2C:
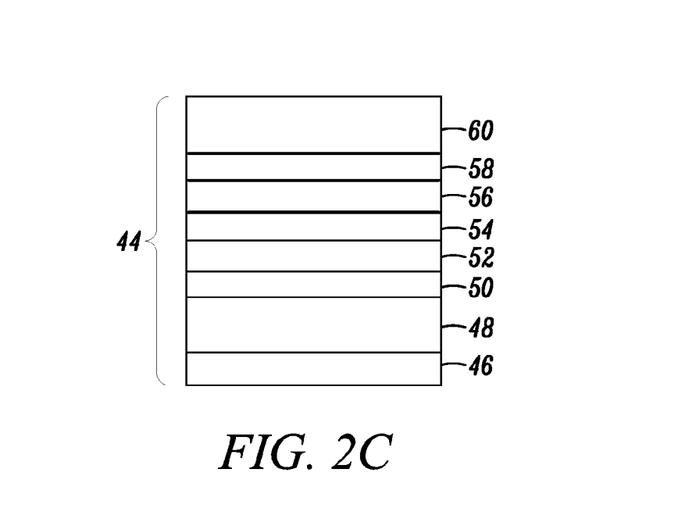

Referring next to FIGS. 2A-2C, exemplary multi-layer films 20, 32, 44 are illustrated. Although several multi-layer films 20, 32, 44 are illustrated, other layers having other configurations, such as having more or fewer layers than those illustrated in FIGS. 2A-2C, or including different types of materials or in different orders, may also be used.

As illustrated in FIG. 2A, the multi-layer film 20 includes a polyamide layer 22, a polyethylene terephthalate layer 24, and a linear low density polyethylene layer 26. The polyamide layer is illustratively bonded to the polyethylene terephthalate layer 24 by a first tie layer 28 and bonded to the linear low density polyethylene layer 26 by a second tie layer 30. In some exemplary embodiments, the tie layers can be various polyolefins that have been heavily plasticized or tacified resulting in partially functionalized olefins that are functionalized with alcohol, amine, or acid groups. The polyolefins may be plasticized or tacified by additives such as tacking agents that include acrylic adhesives, resins (e.g., rosins and their derivates, terpenes and modified terpenes, aliphatic, cycloaliphatic and aromatic resins (C5 aliphatic resins, C9 aromatic resins, and C5/C9 aliphatic/aromatic resins), hydrogenated hydrocarbon resins, and terpene-phenol resins. Specifically, in some exemplary embodiments, first tie layer 28 and second tie layer 30 may be of olefins of the above type modified with maleic anhydride, acrylic acids, polyvinyl alcohols, or ionomer resins.

Another exemplary multi-layer film 32 is provided in FIG. 2B. As illustrated in FIG. 2B, the multi-layer film 32 includes a polyamide layer 34 attached to a paper substrate 36 by a first tie layer 38. The paper substrate 36 is further attached to a linear low density polyethylene layer 40 by a second tie layer 42.

Yet another exemplary multi-layer film 44 is provided in FIG. 2C. As illustrated in FIG. 2C, the multi-layer film 44 includes a first polyamide layer 46 attached to a polyethylene layer 48. The polyethylene is illustratively attached using a first tie layer 50 to a second polyamide layer 52. The second polyamide layer 52 is illustratively attached to an ethylene vinyl alcohol layer 54. The ethylene vinyl alcohol layer 54 is illustratively attached to a third polyamide layer 56, which is attached using a second tie layer 58 to an ionomer resin layer 60.

Figure 3:
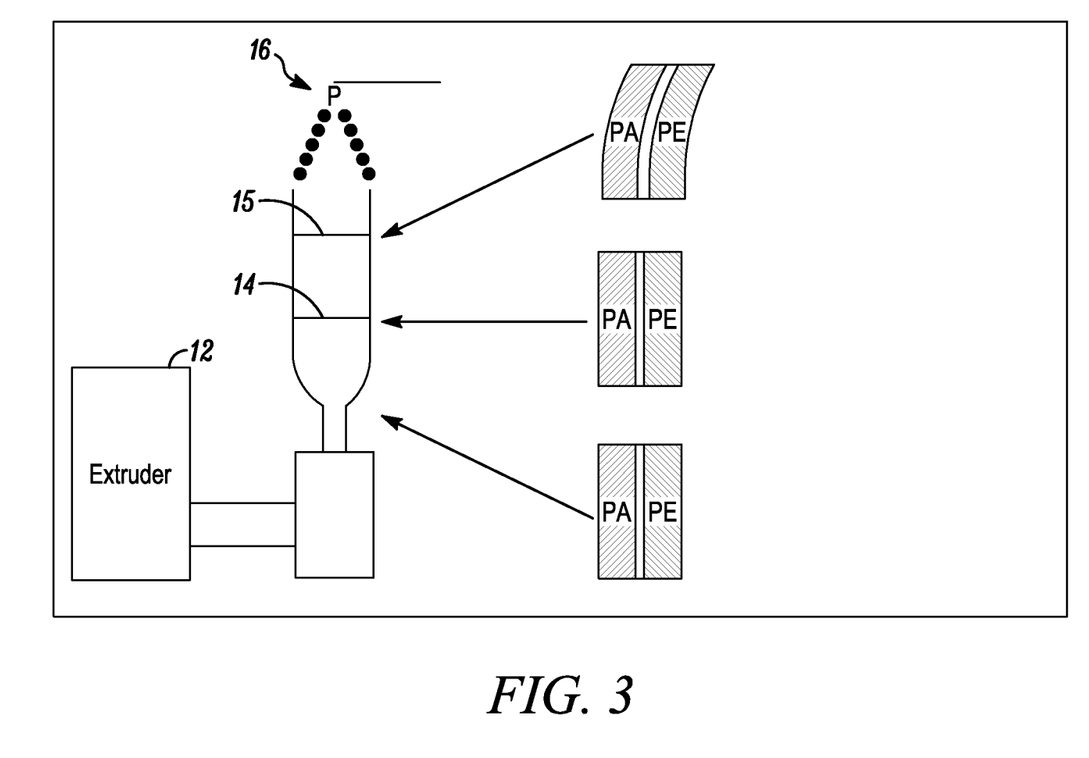
FIG. 3 illustrates polyamide and polyethylene layers at different positions in an exemplary blown film process.

Referring next to FIG. 3, an exemplary blown film process is illustrated for a film having multiple layers, illustratively including polyamide (PA) and polyethylene (PE) layers. Polyamide has a higher melt temperature than polyethylene, and thus the PA film solidifies before solidification of the PE film. Upon exiting the die of the extruder, the temperature of each film is typically greater than 220° C., and both the PA and PE films are in molten form. At PA frostline 14, typically occurring between about 180° C. and 140° C., the PA film solidifies and shrinks in the axial direction oriented between the extruder 12 to rollers 16, while the PE film, still soft and partially molten, shrinks with the solidifying PA film. At PE frostline 15, typically occurring between about 120° C. and 80° C., the PE film solidifies and shrinks. However, because the PA film has already solidified and is rigid, the PA film cannot shrink, and the overall film curls outwardly in a direction toward the PE side as shown in FIG. 3.

As discussed in greater detail below, by varying the composition of the PA film, the frost line of the PA film can form at a greater distance from the extruder, i.e., will move upwardly, when the exemplary blown film process bubble is oriented as shown in FIG. 1, closer to the frost line of the PE film. As a result, the PA film will remain in a molten or semi-molten, non-crystallized form for a greater period of time, and will solidify or crystallize at a temperature closer to that of the PE film, thereby reducing or substantially eliminating the undesirable curling discussed above.

In one exemplary embodiment, a polyamide composition is provided. The composition is formed of caprolactam and AH salt (hexamethylenediamine adipate (1:1)). Caprolactam is a monomer that forms PA 6 via a ring opening polymerization. AH salts form PA 66 via condensation polymerization.

In some embodiments, the caprolactam makes up as little as 85 mol. %, 90 mol. %, 94 mol. %, 95 mol. %, 96 mol. %, or as great as 97 mol. %, 98 mol. %, or 99 mol. %, of the total moles of caprolactam and AH salt, or within any range defined between any two of the foregoing values, such as 85 mol. % to 99 mol. %, 90 mol. % to 99 mol. %, 94 mol. % to 99 mol. %, or 94 mol. % to 96 mol. %, for example. In some embodiments, the AH salt makes up as little as 1 mol. %, 2 mol. %, 3 mol. %, or as great as 4 mol. %, 5 mol. %, 6 mol. %, 10 mol. %, 15 mol. %, of the total moles of caprolactam and AH salt, or within any range defined between any two of the foregoing values, such as 1 mol. % to 15 mol. %, 1 mol. % to 10 mol. %, 1 mol. % to 6 mol. %, or 4 mol. % to 6 mol. %, for example.

In some embodiments, the polyamide composition has a relatively low melt point as measured by Differential Scanning calorimetry (DSC) using ASTM D3418 compared to a polyamide composition formed from a similar blend of PA 6 and PA 66 or PA 6/66 pellets. In particular, the polyamide composition may have a melt point as low as 180° C., 190° C., 195° C., or as high as 200° C., 205° C., 210° C., 215° C., or within any range defined between any two of the foregoing values, such as 180° C. to 215° C., 190° C. to 210° C., or 195° C. to 210° C., for example.

In some embodiments, the polyamide composition has a relatively low crystallization temperature as measured by Differential Scanning calorimetry (DSC) using ASTM D3418 compared to a polyamide composition formed from a similar blend of PA 6 and PA 66 or PA 6/66 pellets. In particular, the polyamide composition may have a crystallization temperature as low as 140° C., 145° C., 150° C., 155° C., or as high as 160° C., 165° C., 170° C., or within any range defined between any two of the foregoing values, such as 140° C. to 170° C., 150° C. to 160° C., or 155° C. to 160° C., for example.

In some embodiments, a cast film formed from the polyamide composition has a relatively low crystallization temperature as measured by Differential Scanning calorimetry (DSC) using ASTM D3418 compared to a cast film formed from a similar blend of PA 6 and PA 66 or PA 6/66 pellets. In particular, the film may have a crystallization temperature as low as 140° C., 145° C., 150° C., 155° C., or as high as 160° C., 165° C., 170° C., or within any range defined between any two of the foregoing values, such as 140° C. to 170° C., 145° C. to 170° C., or 155° C. to 170° C., for example.

In some embodiments, the polyamide composition has a relatively long isothermal crystallization time as measured by Differential Scanning calorimetry (DSC) using ASTM E2070 compared to a polyamide composition formed from a similar blend of PA 6 and PA 66 or PA 6/66 pellets. In particular, the polyamide composition may have an isothermal crystallization time as little as 1 min, 2 min, 4 min, 6 min, or as high as 8 min, 10 min, 12 min, 14 min or within any range defined between any two of the foregoing values, such as 1.5 min to 4 min, 2 min to 4 min, or 2.1 min to 3.7 min, for example. In some embodiments, isothermal crystallization was performed at 170° C. to measure isothermal crystallization time, among other properties.

In one exemplary embodiment, the caprolactam and AH salt are blended together at elevated temperatures, such as low as about 150° C., 155° C., as great as 160° C., 165° C., 170° C., or within any range defined between any two of the foregoing values, such 150° C. to 170° C., or 155° C. to 165° C. for example. In some exemplary embodiments, the caprolactam and AH salt may be mildly agitated during heating to provide more uniform heat transfer and mixing. In one more particular embodiment, the AH salt is added as a dry powder. In another more particular embodiment, the AH salt is added as an aqueous solution, such as an aqueous solution containing as little as about 50 wt. %, 52 wt. %, 55 wt. %, as great as 58 wt. %, 60 wt. %, or within any range defined between any two of the foregoing values, such 50 wt. % to 60 wt. % or 55 wt. % to 60 wt. %, for example. In some embodiments, the caprolactam and AH salt are blended in the presence of water.

The mixture of caprolactam and AH salt, and optionally water, is polymerized to form the polyamide composition. The polymerization is illustratively carried out using a batch continuously stirred tank reactor, a VK tube, or a continuous polymerization train, as described by K. C. Seavey, et al., "A New Phase-Equilibrium Model for Simulating Industrial Nylon-6 Production Trains," Ind. Eng. Chem. Res. 2003, 42, 3900-3913.

Figure 6:
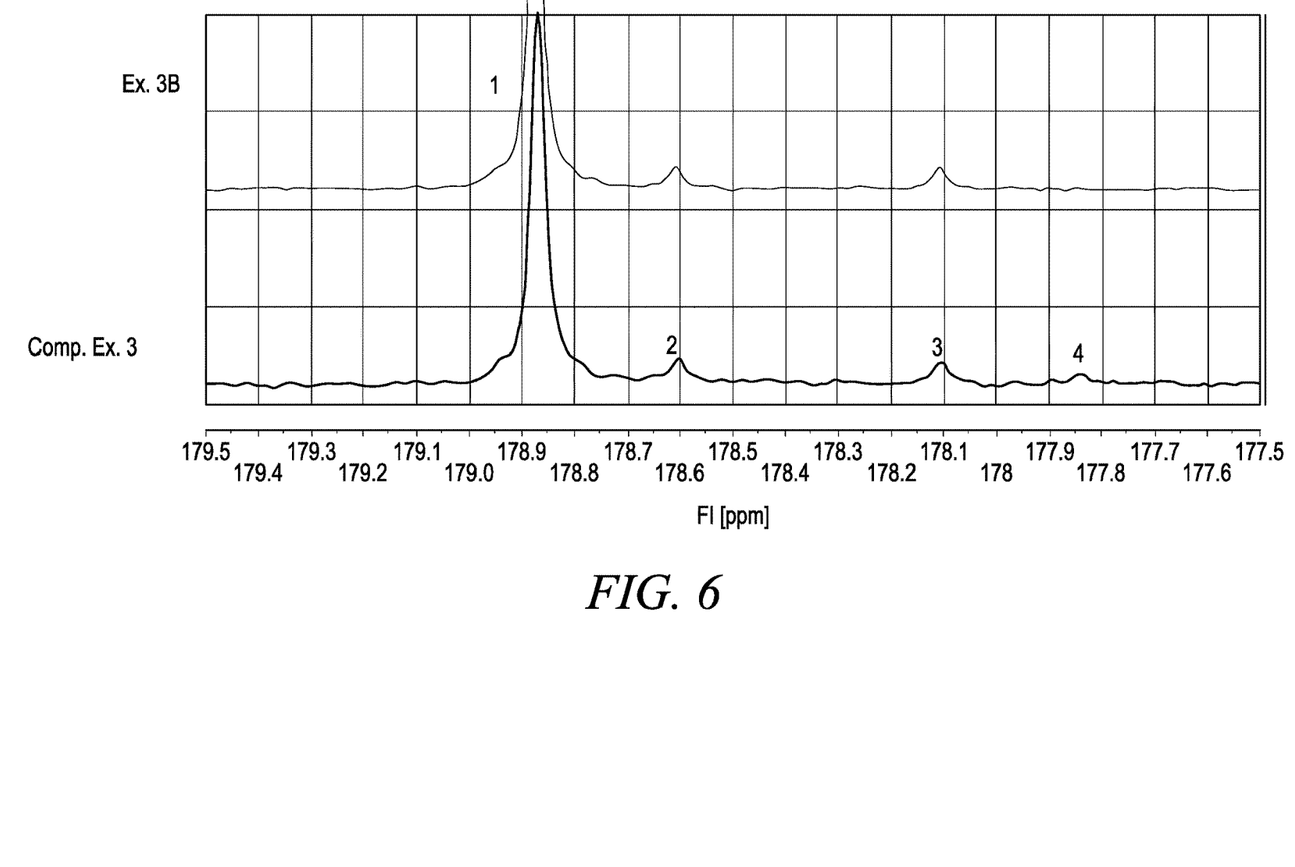
FIG. 6 is related to Example 4 and provides the $^{13}$C NMR spectra for Ex. 3B and Comp. Ex. 3 copolymers formed from compositions having varying levels of monomers.

The polyamide composition may have a relatively high degree of randomness in some embodiments. In some exemplary embodiments, the degree of randomness is calculated (with Formulas I and II as shown below) from the intensities of carbonyl peaks in the spectra as shown in FIG. 6.

$$N6, 6 \text{ wt } \% = \frac{I_{N6,6-N6} + I_{N6,6-N6,6}}{I_{total}} \times 100\% \tag{I}$$

$$\text{Degree of randomness}(R) = \tag{II}$$

$$\frac{I_{N6-N6,6}}{I_{N6-N6} + I_{N6-N6,6}} + \frac{I_{N6,6-N6}}{I_{N6,6-N6} + I_{N6,6-N6,6}}$$

In some exemplary embodiments, the measured degree of randomness may be as little as 0.7, 0.85, 0.95, as high as 0.975, 1.00, 1.25, or within any range defined by any two of the foregoing values, such as 0.7 to 1.1, 0.82 to 1.01, or 0.95 to 1.01, for example.

In some exemplary embodiments, a cast film formed from the polyamide composition has a relatively high storage modulus. The storage modulus may be measured according to ASTM D882 in some embodiments. In some exemplary embodiments, the measured storage modulus may be as little as 240 Pa, 242 Pa, 244 Pa, as high as 246 Pa, 248 Pa, 250 Pa, or within any range defined by any two of the foregoing values, such as 240 Pa to 250 Pa, or 244 Pa to 249 Pa, for example.

The polyamide composition film may have a relatively high creep recovery in some exemplary embodiments. The creep recovery may be measured by parallel plate rheometry or oscillatory rheometry. Parallel plate rheometry was conducted on a rheometer, such as TA Instruments Discovery HR-2 Hybrid Rheometer. Samples of 4-5 grams were placed in between 25 mm rotors, and the gap between the rotors was adjusted to 1 mm. A frequency sweep experiment ranging from 0.1 radians/second to 700 radians/second was conducted for crossover experiments. A constant shear of 50 Pascals (Pa) was applied for 100 seconds and monitored to measure creep recovery. The temperature at which testing was performed was at 260° C. In some exemplary embodiments, the measured creep recovery may be as little as 3.5%, 3.75%, 4%, as high as 4.25%, 4.5%, or within any range defined by any two of the foregoing values, such as 3.5% to 4.5%, for example.

The polyamide composition film may have a relatively high force at break or melt strength. In some exemplary embodiments, the force at break is measured by melt strength testing. Melt strength testing is performed with an instrument (e.g., Gottfert Rheotens instrument) used in accordance with a standard procedure disclosed in the instrument's instruction manual. In some exemplary embodiments, melt strength testing is performed in accordance with ASTM D1238. A rheometer was operated at 260° C. with a 2 mm diameter and 10 mm long die. The molten extrudate was accelerated on take-away wheels and the resulting load is recorded when the molten extrudate breaks. In some exemplary embodiments, the measured force at break may be as little as 0.070 N, 0.075 N, 0.080 N, 0.085 N, as high as 0.090 N, 0.095 N, 0.099 N, 0.110 N, or within any range defined by any two of the foregoing values, such as 0.08 N to 0.09 N, 0.075 N to 0.095 N, 0.085 N to 0.095 N, or 0.090 N to 0.095 N, for example.

Mechanical properties of the cast film formed from the polyamide composition was also measured. Properties such as tensile strength, modulus, and yield strength are measured in both the machine direction (MD), or lengthwise along the direct of extrusion, of the film and in the transverse direction (TD), or in a direction perpendicular to the direction of extrusion, across the film.

In some exemplary embodiments, the polyamide composition has a relatively low tensile strength in the machine direction (MD). In some exemplary embodiments, the tensile strength in MD is measured according to the test procedure as disclosed in ASTM D882. The measured tensile strength may be as little as 2700 psi, 2900 psi, 3100 psi, as high as 3300 psi, 3400 psi, 3500 psi, or within any range defined by any two of the foregoing values, such as 2700 psi to 3500 psi, or 2777 psi to 3414 psi, for example.

In some exemplary embodiments, the cast film formed from the polyamide composition has a relatively high tensile strength in the transverse direction (TD). In some exemplary embodiments, the tensile strength in TD is measured according to the test procedure according to the test procedure as disclosed in ASTM D882. The measured tensile strength in TD may be as little as 3100 psi, 3150 psi, 3200 psi, as high as 3300 psi, 3350 psi, 3400 psi, or within any range defined by any two of the foregoing values, such as 3100 psi to 3400 psi, or 3113 psi to 3379 psi, for example.

The cast film from the polyamide composition may also have a relatively low modulus in MD. In some exemplary embodiments, the modulus in MD is measured according to the test procedure as disclosed in ASTM D882. The measured modulus in MD may be as little as 6500 psi, 8000 psi, 10500 psi, as high as 13000 psi, 15500 psi, 17000 psi, or within any range defined by any two of the foregoing values, such as 6500 psi to 17000 psi, for example.

In some exemplary embodiments, the polyamide composition has a relatively high modulus in the transverse direction (TD). In some exemplary embodiments, the modulus in TD is measured according to the test procedure as disclosed in ASTM D882. The measured modulus in TD as measured by the Example 7 test procedure may be as little as 6500 psi, 9500 psi, 12500 psi, as high as 14000 psi, 17000 psi, 20000 psi, or within any range defined by any two of the foregoing values, such as 6500 psi to 20000 psi, or 6743 psi to 19864 psi, for example.

The polyamide composition may have a relatively low yield strength in the machine direction (MD). In some exemplary embodiments, yield strength in MD is measured according to the test procedure as disclosed in ASTM D882. In some exemplary embodiments, the measured yield strength in MD may be as little as 950 psi, 1000 psi, 1050 psi, as high as 1100 psi, 1150 psi, 1200 psi, or within any range defined by any two of the foregoing values, such as 950 psi to 1200 psi, or 959 psi to 1107 psi, for example.

In some exemplary embodiments, the polyamide composition has a relatively low yield strength in the transverse direction (TD). In some exemplary embodiments, yield strength in TD is measured according to the test procedure as disclosed in ASTM D882. The measured yield strength in TD may be as little as 1000 psi, 1050 psi, 1100 psi, as high as 1150 psi, 1175 psi, 1200 psi, or within any range defined by any two of the foregoing values, such as 1000 psi to 1200 psi, or 1040 psi to 1158 psi, for example.

The polyamide composition may have puncture resistant properties. In some exemplary embodiments, puncture resistance is measured according to the test procedure as disclosed in ASTM D5748. In some exemplary embodiments, the puncture resistance may be as little as 55 in-$lb_f$, 60 in-$lb_f$, 65 in-$lb_f$, as high as 85 in-$lb_f$, 90 in-$lb_f$, 95 in-$lb_f$, or within any range defined by any two of the foregoing values, such as 55 in-$lb_f$ to 95 in-$lb_f$ or 56 in-$lb_f$ to 92 in-$lb_f$, for example.

In some exemplary embodiments, the polyamide composition has a relatively high residual wall thickness. In some exemplary embodiments, the residual wall thickness is measured according to the test procedure as disclosed in ASTM D882. In some exemplary embodiments, the residual wall thickness as measured by the Example 8 test procedure may be as little as 85%, 88%, 91%, as high as 93%, 95%, 97%, or within any range defined by any two of the foregoing values, such as 85% to 97% or 87.8% to 95.6%, for example.

Without wishing to be held to any particular theory, it is believed that blending the monomers of caprolactam and AH salt provides a highly randomized distribution of the AH salt monomers in the caprolactam monomers, resulting in a more homogenous distribution of monomers in the polymerized composition.

Referring again to FIG. 1, in one exemplary embodiment, a blown film 18 may be formed from the polyamide composition. The polyamide composition is fed, such as in pellet form, to an extruder 12. The extruder 12 extrudes the polyamide composition in molten or semi-molten form, where it is formed into a bubble 10 by injecting air through an injection port in extruder 12. The polyamide composition cools, eventually crystallizing when the temperature of the polyamide composition reaches the crystallization temperature at the frost line 14. The solidified sheet is then gathered by one or more rollers 16 into a continuous film 18.

EXAMPLES

Exemplary formulations were tested using differential scanning calorimetry to determine melt point temperature ($T_m$) and crystallization temperature ($T_c$) in accordance with ASTM D3418 and isothermal crystallization time ($t_{1/2}$) in accordance with ASTM E2070.

Without wishing to be held to any particular theory, it is believed that the isothermal crystallization time is related to the location of the frost line in blown film extrusion, specifically, at a constant extrusion speed, a shorter isothermal crystallization time corresponds to a shorter travel distance from the extruder head, and thus a frost line closer to the extruder. Conversely, a longer isothermal crystallization time corresponds to a longer travel distance from the extruder head, and thus a frost line further from the extruder.

Example 1

Figure 4:
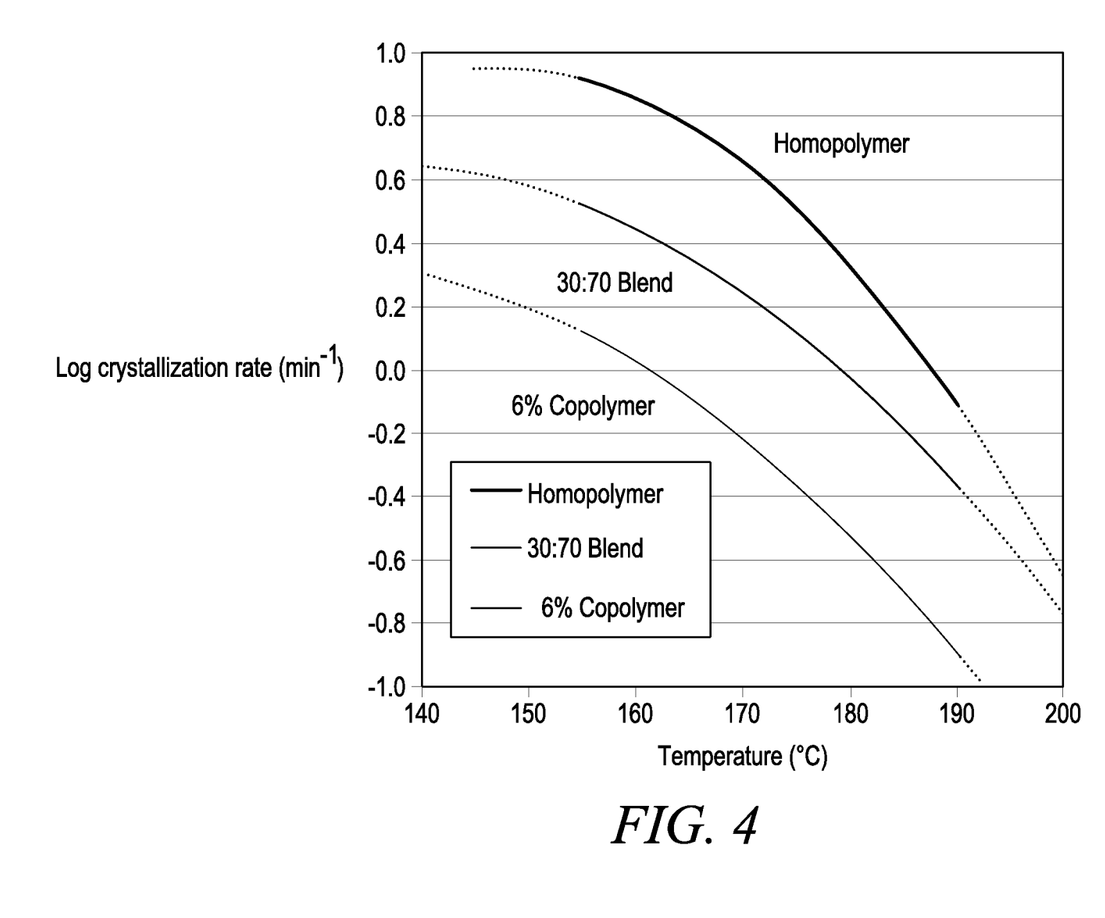
FIG. 4 is related to Example 1 and provides the crystallization rate as a function of temperature for various formulations.

Referring to FIG. 4, the log crystallization rate of various compositions was determined as a function of temperature. Solid lines indicate experimental data, while dashed lines indicate extrapolated values for crystallization rate based on the Sestak Berggren equation. As shown in the upper curve of FIG. 4, the crystallization rate of PA 6 homopolymer is relatively high.

The middle curve of FIG. 4 shows the crystallization rate of a blend of 70% PA 6 homopolymer having a melting point of 220° C., relative viscosity of 4.0 with 30% of a PA 6/66 copolymer having a melting point of 193° C. and relative viscosity of 4.0. The PA 6/66 copolymer contains about 82 mol. % PA 6 and 18 mol. % PA 66, and the 30:70 blend overall is estimated to contain about 5.4 mol. % of the PA 66 material. As shown in FIG. 3, the addition of the PA 66 reduces the crystallization rate of the blend compared to that of the PA 6 monomer.

The lower curve of FIG. 4 further shows the crystallization rate of a copolymer formed from a blended mixture of 94 mol. % caprolactam and 6 mol. % AH salt. Although containing a similar amount of the AH salt monomers as the 30:70 blend, the 6% copolymer formed from the blended mixture of caprolactam and AH salt had a lower crystallization rate than the 30:70 blend of the middle curve. A lower crystallization rate moves the frost line upwards closer to that of polyethylene such that the 6% copolymer remains in a molten or semi-molten, non-crystallized form for a longer period of time thereby reducing the overall curl as discussed earlier. Without wishing to be held to any particular theory, it is believed that the more homogenous distribution of the AH salt monomers in the caprolactam monomers further lower the crystallization rate.

Example 2

Polyamide compositions containing various amounts of caprolactam and AH salt were produced in pellet form. Pellets of each composition were produced according to the molar percent of caprolactam and AH salt shown in Table 1. For each sample, the polyamide composition was produced in a continuous process from the caprolactam and AH salt monomers. The temperature for each stage was set to 260° C. with a flow rate of around 7000 lb/hr.

Thermal analysis was performed on a 6 mg sample of each composition by using a TA Q series differential scanning calorimeter (DSC) at a heating rate of 10° C./min to 265° C., followed by rapid cooling to 170° C. and holding for 30 minutes. The $T_m$, $T_c$, and $t_{1/2}$ for each sample are provided in Table 1.

TABLE 1

$T_m$, $T_c$, and $t_{1/2}$ of compositions having varying levels of monomers

| Ref. No. | Mol. % Caprolactam | Mol. % AH Salt | $T_m$ (° C.) | $T_c$ (° C.) | $t_{1/2}$ (min) |
|---|---|---|---|---|---|
| Ex 1A | 96 | 4 | 208.5 | 159.7 | 1.16 |
| Ex 1B | 94 | 6 | 203.3 | 156.8 | 2.14 |
| Ex 1C | 92 | 8 | 199 | 150.7 | 3.65 |
| Ex 1D | 90 | 10 | 198.4 | 151.3 | 3.66 |

As shown in Table 1, increasing the amount of AH salt monomers in the copolymer resulted in generally decreasing melt and crystallization temperatures and increasing isothermal crystallization time.

Example 3

Polyamide compositions containing various amounts of caprolactam and AH salt were produced in pellet form. Pellets of each composition were produced according to the molar percent of caprolactam and AH salt shown in Table 2.

Cast films were prepared from pellets of each composition using a Haake single screw extruder (Zone temperature: 240~260° C., roll temperature: 25° C., screw rpm: 75, melt temperature: 250° C.). In addition, comparative films were produced from a dry blended mixture of 70% PA6 and 30 PA 6/66 pellets. The PA 6 pellets were Ultramid® B40 polyamide and the PA 6/66 pellets were Ultramid® C40 L polyamide, each available from BASF. The comparative pellets were similar in PA 6 and PA 66 concentration to the 94/6 concentration of Ex. 2B.

Thermal analysis was performed on a 6 mg sample of each composition by using a TA Q series differential scanning calorimeter (DSC) at a heating rate of 10° C./min to 265° C., followed by rapid cooling to 170° C. and holding for 30 minutes. The $T_m$, $T_c$, and $t_{1/2}$ for each sample are provided in Table 2.

TABLE 2

$T_m$, $T_c$, and $t_{1/2}$ of films formed from compositions having varying levels of monomers

| Ref. No. | Mol. % Caprolactam | Mol. % AH Salt | $T_m$ (° C.) | $T_c$ (° C.) | $t_{1/2}$ (min) |
|---|---|---|---|---|---|
| Comp. Ex. 2 | — | — | 209.9; 217.9 | 181 | 0.28 |
| Ex. 2A | 96 | 4 | 210 | 167.4 | 1.06 |
| Ex. 2B | 94 | 6 | 206 | 162 | 1.43 |
| Ex. 2C | 92 | 8 | 201.7 | 156.2 | 3.75 |
| Ex. 2D | 90 | 10 | 203.3 | 161.7 | 1.98 |
| Ex. 2E | 85 | 15 | 190.1 | 144.8 | N/A |

As shown in Table 2, increasing the PA 66 nature of the composition by increasing the percentage of AH salt in the copolymer resulted in generally decreasing melt and crystallization temperatures and increasing isothermal crystallization time.

In addition, Examples 2A-2E, which were formed from the wholly compounded PA compositions, had a lower crystallization temperature ($T_a$) and longer isothermal crystallization time than the pellet blend of Comp. Ex. 2. Ex. 2B and Comp. Ex. 2 each contained about 94 mol. % caprolactam and 6 mol. % AH salt. However, the Ex. 2B sample provided a decrease of nearly 20° C. and a substantial increase in isothermal crystallization time compared to Comp. Ex. 2. Without wishing to be held to any particular theory, it is believed that forming the copolymer directly from the caprolactam and AH salt monomers provides for a more homogenous distribution of the AH salt monomers within the end composition compared to a blend of PA 6 and PA 6/66 compositions. This increased homogeneity is believed to provide the substantial improvements shown in Table 2, even at comparable monomer concentrations.

Examples 4-8

As shown in Table 3 below, various copolymer were tested for their respective properties and compared to a blend of 70 wt. % PA 6 homopolymer with 30 wt. % of a PA 6/66 copolymer (Comparative Example 3). The copolymers were made using continuous melt polymerization in which a physical powder blend or melt blend of 70 wt. % of B40 PA 6 homopolymer and 30 wt. % of C40L PA6/66 copolymer were fed into a single screw extruder operating at a melt temperature of 250° C.

Thermal analysis was performed on the samples shown in Table 3 and conducted in the manner as described in Example 3.

TABLE 3

$T_m$, $T_c$, and moisture measurements of films formed from compositions having varying levels of monomers

| Ref. No. | Mol. % Caprolactam | Mol. % AH Salt | FAV | $T_m$ (° C.) | $T_c$ (° C.) | Moisture (ppm) |
|---|---|---|---|---|---|---|
| Comp. Ex. 3 | — | — | 160 | 220.5 | 166.5 | — |
| Ex. 3A | 96 | 4 | 160 | 206.3 | 160.7 | 220 |
| Ex. 3B | 94 | 6 | 160 | 202.1 | 151.1 | 610 |
| Ex. 3C | 92 | 8 | 160 | 200.5 | 148.2 | 130 |
| Ex. 3D | 90 | 10 | 160 | 196.7 | 148.9 | 270 |

Figure 5A:
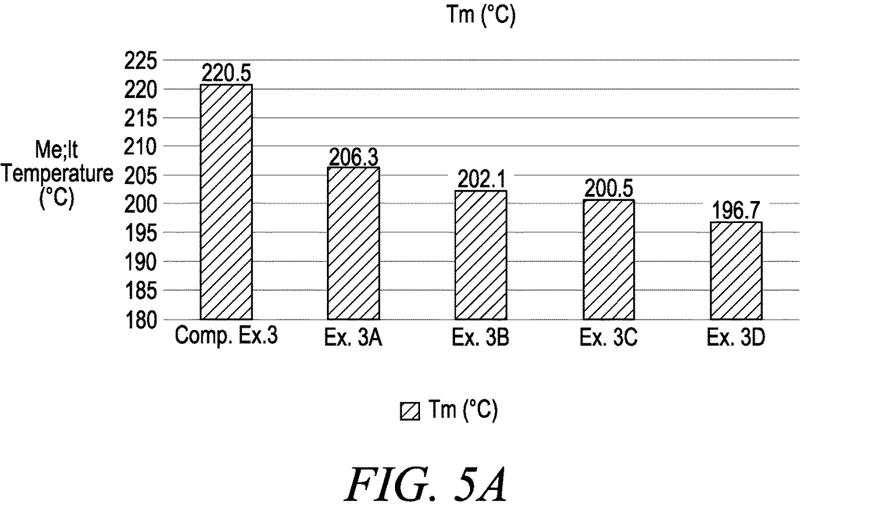
FIG. 5A is related to Examples 4-8 and provides the melt temperature for copolymers formed from compositions having varying levels of monomers.
Figure 5B:
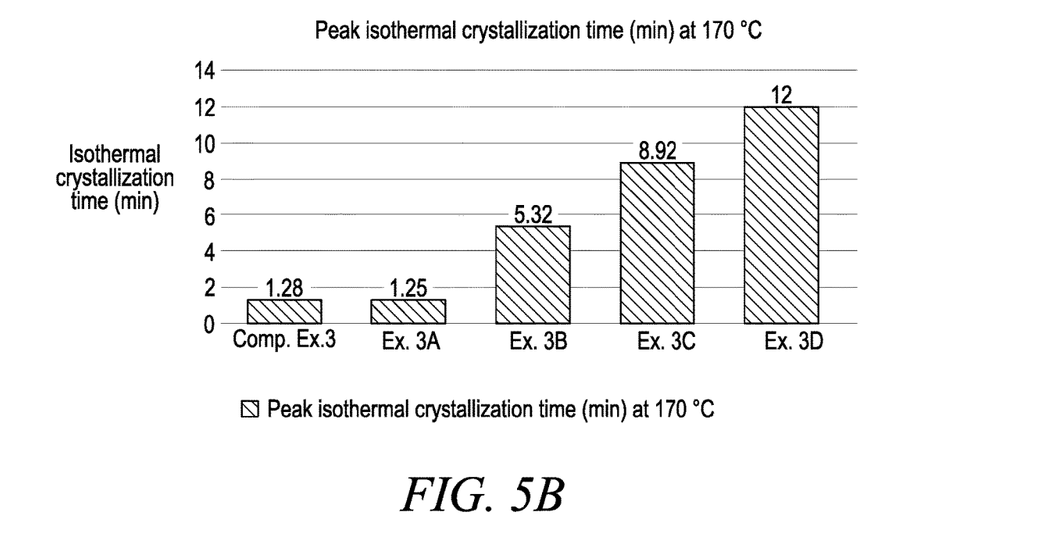
FIG. 5B is related to Examples 4-8 and provides the peak isothermal crystallization time (in minutes) at 170° C. for copolymers formed from compositions having varying levels of monomers.

As shown in Table 3 and in FIGS. 5A and 5B, increasing the PA 66 nature of the composition by increasing the percentage of AH salt in the copolymer resulted in generally decreasing melt and crystallization temperatures and increasing isothermal crystallization time at 170° C. (FIG. 5B).

In addition, Examples 3A-3D, which were formed from the wholly compounded PA compositions, had a lower melt temperature ($T_m$) and crystallization temperature ($T_c$) than the pellet blend of Comp. Ex. 3 as shown in FIG. 5A. Ex. 3B and Comp. Ex. 3 each contained about 94 mol. % caprolactam and 6 mol. % AH salt. However, the Ex. 3B sample provided a decrease of nearly 20° C. (FIG. 5A) and a substantial increase in isothermal crystallization time (FIG. 5B) compared to Comp. Ex. 3. Without wishing to be held to any particular theory, it is believed that forming the copolymer directly from the caprolactam and AH salt monomers provides for a more homogenous distribution of the AH salt monomers within the end composition compared to a blend of PA 6 and PA 6/66 compositions. This increased homogeneity is believed to provide the substantial improvements shown in Table 3, even at comparable monomer concentrations.

Example 4

Polyamide compositions containing various amounts of caprolactam and AH salt were produced in pellet form. Samples for nuclear magnetic resonance (NMR) spectroscopy were prepared in 5 mm NMR tubes. Each sample weighed approximately 25 mg and was dissolved in 1 mL deuterated $H_2SO_4$ to get a clear solution. The solution was locked externally with either a 0.2 mL solution of $CDCl_3$ or a 0.2 mL solution of $CD_3COCD_3$ and spectra were recorded on a 100 MHz ($^{13}C$) NMR instrument. The $^{13}C$ Quantitative NMR spectra were acquired using a program (e.g., Bruker pulse program).

$^{13}C$ NMR spectroscopy was utilized to determine the distribution of N6 and N6,6 structural units in polyamide 6/6,6 copolymer. A sample of each formulation was dissolved in deuterated sulfuric acid solution (96-98 wt. % in $D_2O$) at a concentration of approx. 2.5 wt %, and chemical shifts were measured with respect to an external locking agent of either $CDCl_3$ or $CD_3COCD_3$.

Quantitative $^{13}C$ spectra were acquired on a Bruker AV-III 400 MHz NMR Spectrometer operating at 100.62 MHz, the spectral width was 24 kHz, the relaxation delay was 5 seconds, and inverse gated decoupling was used to eliminate the nuclear Overhauser effect. A total of 8000 scans were acquired.

The composition, the sequence distributions, and the degree of randomness were calculated (with Formulas I and II as shown below) from the intensities of carbonyl peaks in the spectra as shown in FIG. 6.

$$N6,6 \text{ wt \%} = \frac{I_{N6,6-N6} + I_{N6,6-N6,6}}{I_{total}} \times 100\% \quad (I)$$

$$\text{Degree of randomness}(R) = \quad (II)$$
$$\frac{I_{N6-N6,6}}{I_{N6-N6} + I_{N6-N6,6}} + \frac{I_{N6,6-N6}}{I_{N6,6-N6} + I_{N6,6-N6,6}}$$

Figure 7:
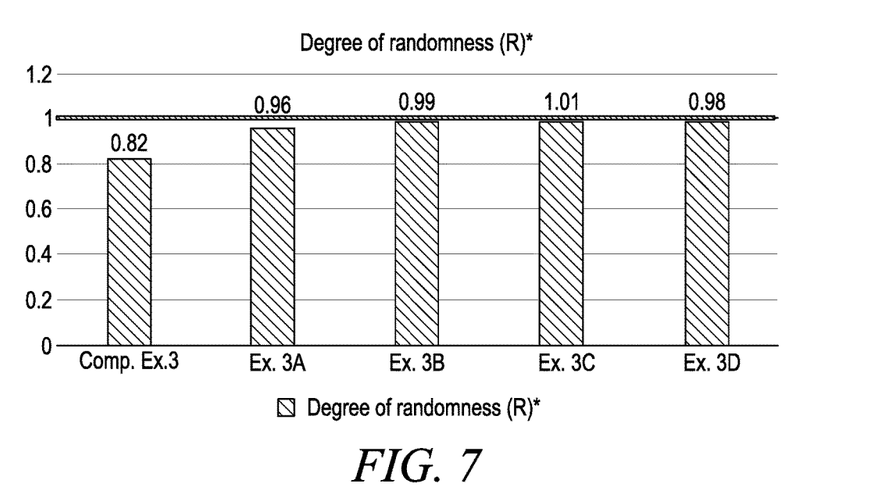
FIG. 7 is related to Example 4 and provides the degree of randomness for copolymers formed from compositions having varying levels of monomers.

As shown in FIG. 6, Comp. Ex. 3 has an additional peak at point 4 indicating the presence of additional N6,6,-N6,6 block. Furthermore, as shown in FIG. 7 and in Table 4 below, as compared to Comp. Ex. 3, the degree of randomness increases with Examples 3A-3D. As such, Ex. 3A-3D yield more random copolymers than melt blending in a single screw extruder. Also, Ex. 3A and 3B have lower polyamide 6,6 content and N6-N66 and N66-N6 bonding as compared to Comp. Ex. 3.

TABLE 4

Compositions of films formed from compositions having varying levels of monomers

| Sample. | Polyamide 66 Content (wt. %) | CPL-CPL Bond (mol %) N6-N6 | CPL-HMDA Bond (mol %) N6-N66 | ADA-CPL Bond (mol %) N66-N6 | ADA-HDMA Bond (mol %) N66-N66 | Degree of Randomness |
|---|---|---|---|---|---|---|
| Comp. Ex. 3 | 10.5 | 81.2 | 8.2 | 7.7 | 2.9 | 0.8 |
| Ex. 3A | 6.4 | 87.3 | 6.3 | 5.7 | 0.7 | 1.0 |
| Ex. 3B | 7.9 | 84.4 | 7.7 | 7.2 | 0.7 | 1.0 |
| Ex. 3C | 9.4 | 80.9 | 9.7 | 8.5 | 0.9 | 1.0 |
| Ex. 3D | 11.7 | 77.7 | 10.6 | 10.1 | 1.6 | 1.0 |

Example 5

Polyamide compositions containing various amounts of caprolactam and AH salt were produced in pellet form. Parallel plate rheometry was conducted on a rheometer, such as TA Instruments Discovery HR-2 Hybrid Rheometer. Samples of 4-5 grams were placed in between 25 mm rotors and the gap between the rotors was adjusted to 1 mm. A frequency sweep experiment ranging from 0.1 radians/second to 700 radians/second was conducted for crossover experiments. A constant shear of 50 Pascals (Pa) was applied for 100 seconds and monitored to measure creep recovery. The temperature at which testing was performed was at 260° C.

TABLE 5

Parallel Plate Viscosity data of films formed from compositions having varying levels of monomers

| Sample. | FAV | G', Storage Modulus, × 1,000 (Pa) | Creep Recovery (%) | Frequency (rad/s) |
|---|---|---|---|---|
| Comp. Ex. 3 | 140 | 206 | 1.2 | 3917 |
| Ex. 3A | 140 | 249 | 3.5 | 247 |
| Ex. 3B | 140 | 240 | 3.3 | 319 |
| Ex. 3C | 140 | 253 | 4.5 | 246 |
| Ex. 3D | 140 | 244 | 4.4 | 156 |

As shown in Table 5, Ex. 3A-3D exhibited higher creep recovery and storage modulus (G') as compared to Comp. Ex. 3. A higher creep recovery and storage modulus generally leads to a higher melt strength and a better extensibilty as discussed below. An overall higher creep recovery indicates a greater melt elasticity. Furthermore, Ex. 3A-3D show an overall higher molecular weight and an overall lower molecular weight distribution. In blown film applications, bubble stability in Ex. 3A-3D is expected to better than Comp. Ex. 3.

Example 6

Figure 8:
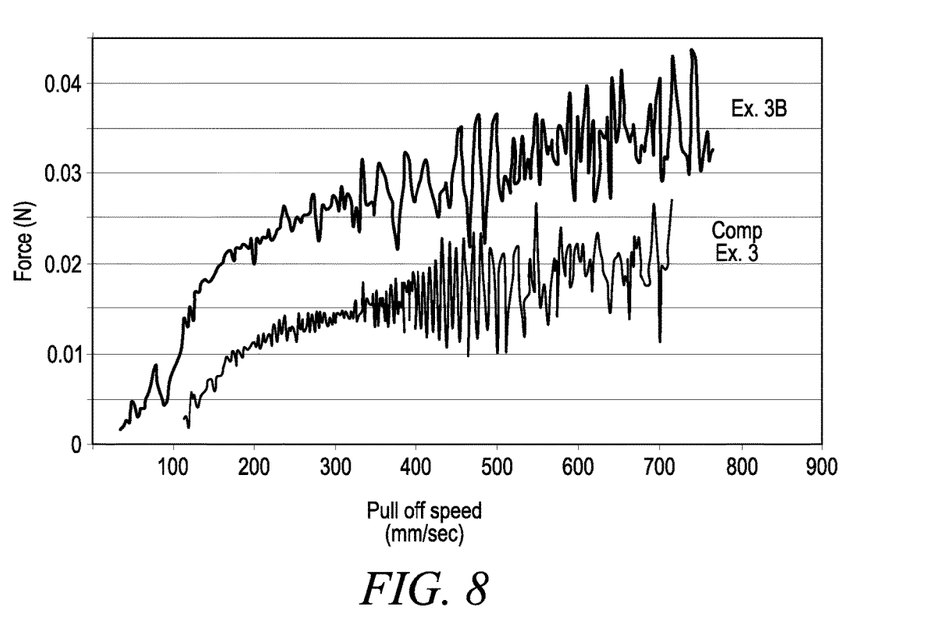
FIG. 8 is related to Example 6 and provides parallel plate viscosity data, specifically the melt strength data for copolymers formed from compositions having varying levels of monomers.

Polyamide compositions containing various amounts of caprolactam and AH salt were produced in pellet form. Melt strength testing was performed with an instrument (e.g., Gottfert Rheotens instrument) used in accordance with a standard procedure disclosed in the instrument's instruction manual. A rheometer was operated a 260° C. with a 2 mm diameter and 10 mm long die. The molten extrudate was accelerated on take-away wheels and the resulting load is recorded when the molten extrudate breaks. The results are shown in FIG. 8 and Table 5 below.

TABLE 6

Parallel Plate Viscosity data of films formed from compositions having varying levels of monomers

| Ref. No. | $V_b$ (mm/s) | F (N) | '(1) | σ (MPa) |
|---|---|---|---|---|
| Comp. Ex. 3 | 741.8 | 0.037 | 15.12 | 0.39 |
| Ex. 3B | 892.6 | 0.093 | 17.79 | 0.94 |

As shown in FIG. 8 and Table 6 shown above, Ex. 3B has a higher melt strength than Comp. Ex. 3. Ex. 3B has a higher speed at break ($V_b$), force at break (N), draw ratio at break ('), and elongational stress at break (σ) than Comp. Ex. 3. Furthermore, as shown in FIG. 8, Ex. 3B has a higher curve than that of Comp. Ex. 3 indicating a higher required force at a certain pull off speed.

Ex. 3B and Comp. Ex. 3 each contained about 94 mol. % caprolactam and 6 mol. % AH salt. However, the Ex. 3B sample provided an increase in speed at break ($V_b$), force at break (N), draw ratio at break ('), and elongational stress at break (σ) compared to Comp. Ex. 3. Without wishing to be held to any particular theory, it is believed that forming the copolymer directly from the caprolactam and AH salt monomers provides for a more homogenous distribution of the AH salt monomers within the end composition compared to a blend of PA 6 and PA 6/66 compositions. This increased homogeneity is believed to provide the substantial improvements, even at comparable monomer concentrations, as shown in Table 6 above and other graphs and/or tables included herein that pertain to Comp. Ex. 3.

Example 7

Monolayer sample films were prepared by blown film equipment that includes three extruders. Various properties of the films, such as puncture resistance as shown in Table 7 and discussed herein, were measured.

TABLE 7

Puncture Resistance of films formed from compositions having varying levels of monomers

| Sample | Puncture Resistance (in*$lb_f$) |
|---|---|
| Comp. Ex. 3 | 34 |
| Ex. 3A | 56 |
| Ex. 3B | 72 |
| Ex. 3C | 73 |
| Ex. 3D | 92 |

The thickness of the films tested were 2 millimeters, and the variables that were altered included process temperature, screw revolutions per minute, line speed, and blower speed. The variables that were measured included: melt temperature and back pressure. The films were too transparent to observe the frost line. Uniformity was obtained from the standard deviation of average thickness at five different spots of films. For the gauge of uniformity, uniformity was measured at 2 mils plus or minus 0.3 mils.

Line speed of the film (feet per minute, fpm) was measured by its length per minute. The line speed was 27 fpm for Ex. 3A-3D and 20 fpm for Comp. Ex. 3. As such, compared to Comp. Ex. 3, Ex. 3A-3D showed a higher line speed. The films' quality was of haze (4-6).

Figure 12:
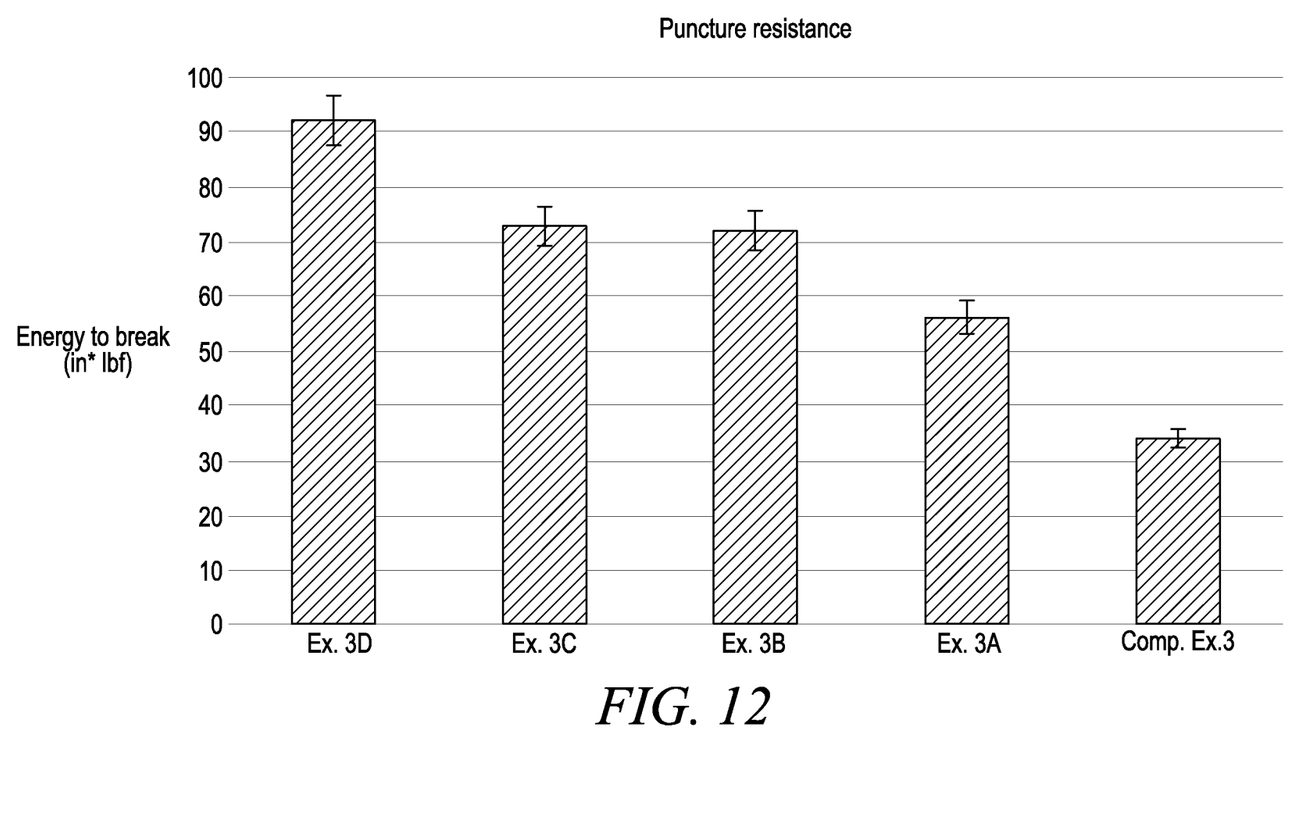
FIG. 12 is related to Example 7 and provides puncture resistance data for copolymers formed from compositions having varying levels of monomers.

As shown in Table 7 above and in FIG. 12, puncture resistances of Comp. Ex. 3 and Ex. 3A-3D were measured based on test methods disclosed in ASTM D5748. As shown, puncture resistances of Ex. 3A-3D were greater than the puncture resistance of Comp. Ex. 3. Moreover, as the amount of caprolactam increased within the samples, the puncture resistance of the samples increased as well.

Example 8

Figure 9:
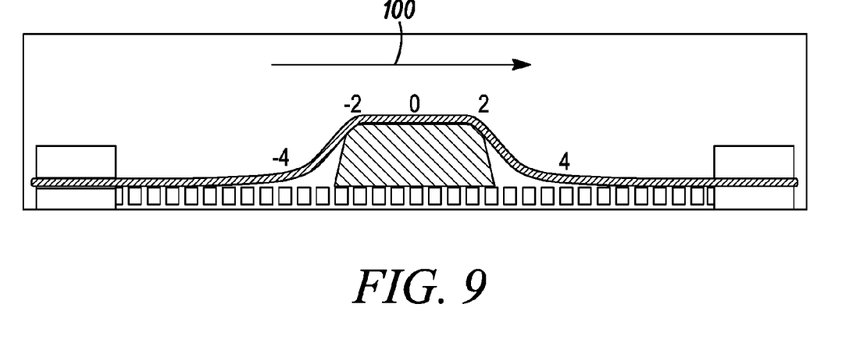
FIG. 9 is related to Example 8 and illustrates the measurement of the thickness profiles for copolymers formed from compositions having varying levels of monomers after thermoforming.

Sample films were tested to simulate industrial thermoforming processing. Testing was conducted in a lab thermoforming machine as shown in FIG. 9. Sheets with a size of 475 mm×380 mm were pre-heated at 400 F for 30 seconds. Sheets were deep drawn in a mold using a vacuum. The mold had a circumference of the rectangle at the base of the form of 23.75 inches, circumference of the rectangle at the top of the form of 21.5 inches, length of the straight edge of the base at each of the long sides of 5.75 inches, length of the straight edge of the base at each of the short sides of 3 inches, length of the straight edge of the top at each of the long sides of 5 inches, length of the straight edge of the top at each of the short sides of 3 inches, and height of the form of 1.4375 inches. Films to be tested were stretched over the mold and then drawn down over the mold by applying vacuum suction from beneath the mold such that the film is shaped as shown in FIG. 9. After the film is shaped, the thickness of the film was measured at various points (−4, −2, 0, 2, 4) along the film, measured relative to the center of the mold, which is denoted by "0" as shown in FIG. 9.

Figure 10:
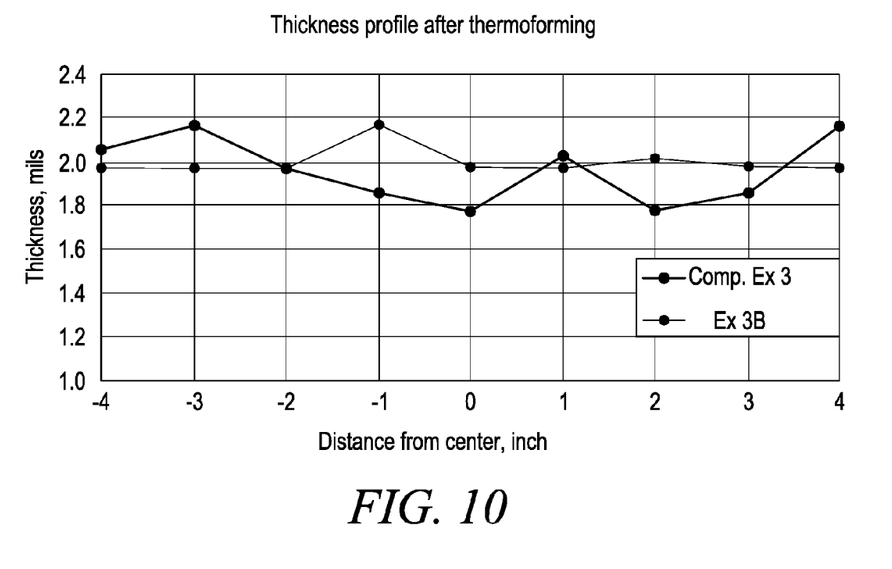
FIG. 10 is related to Example 8 and provides the data for the thickness profile for copolymers formed from compositions having varying levels of monomers after thermoforming.
Figure 11:
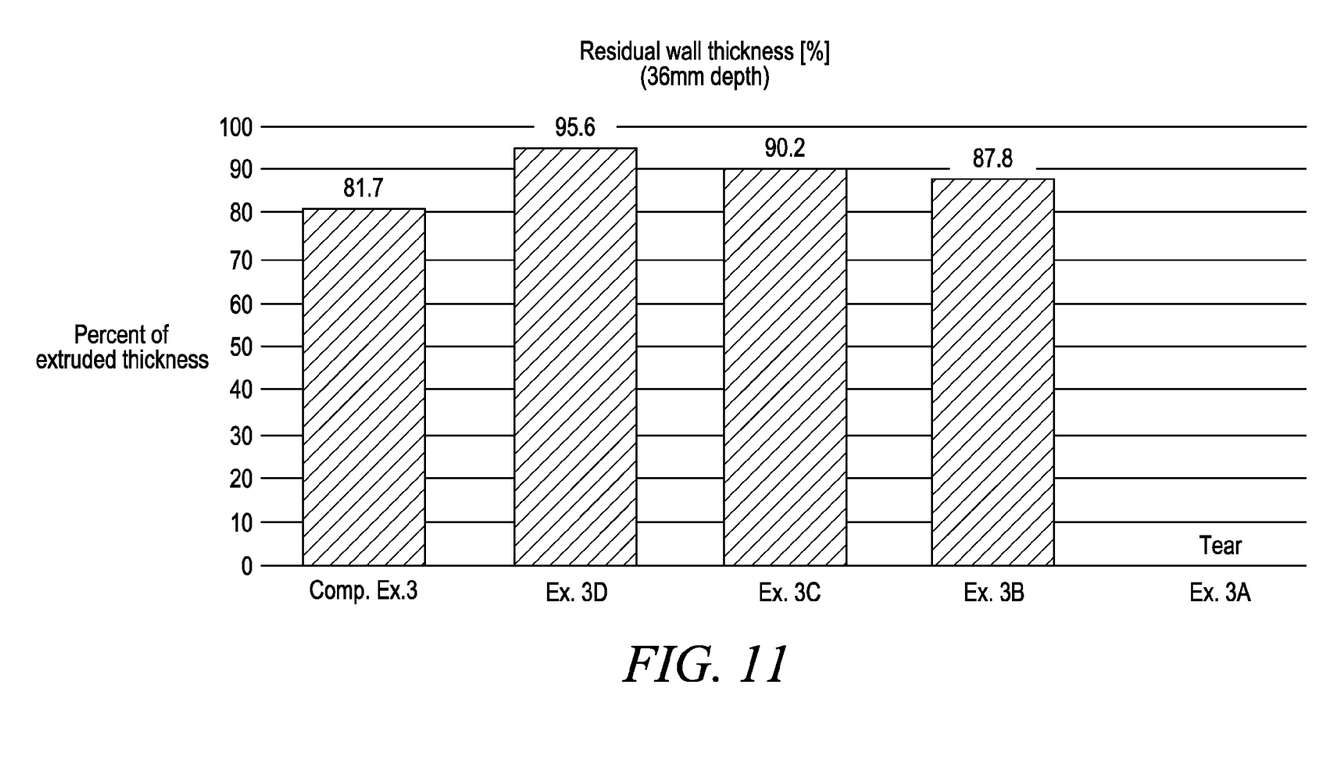
FIG. 11 is related to Example 8 and provides the residual wall thickness data for copolymers formed from compositions having varying levels of monomers.

The thickness profile of the samples were measured along 9 different points along the MD, as denoted by arrow 100, of the stretched film after thermoforming as shown in FIGS. 10 and 11. Residual wall thickness was calculated using the equation: (Stretched film thickness/Original film thickness)× 100.

As shown in FIG. 11, Ex. 3D shows the most consistent gage profile as it has the highest residual wall thickness at 95.6% after thermoforming. Furthermore, from FIG. 11, Ex. 3B-3D have higher residual wall thicknesses (% after thermoforming) than Comp. Ex. 3.

While this invention has been described as relative to exemplary designs, the present invention may be further modified within the spirit and scope of this disclosure. Further, this application is intended to cover such departures from the present disclosure as come within known or customary practice in the art to which this invention pertains.

The invention claimed is:

1. A method of forming a blown film, the method comprising:
    extruding a polyamide copolymer to form a polyamide film, wherein the polyamide copolymer consists of caprolactam and hexamethylenediamine adipate monomers, wherein the caprolactam monomers are present in an amount of from 85 mol. % to 99 mol. % of the total moles of caprolactam and hexamethylenediamine adipate monomers, the polyamide copolymer further having:
        an isothermal crystallization time, measured by Differential Scanning Calorimetry (DSC) according to ASTM E2070, of between 4 minutes and 14 minutes; and
        a degree of randomness of between 0.95 and 1.25; and
    wherein extruding the polyamide copolymer includes forming a bubble in the extruded polyamide copolymer by injecting air through an injection port and gathering the extruded polyamide copolymer with one or more rollers into the polyamide film.

2. The method of claim 1, wherein the caprolactam monomers are present in an amount of from 90 mol. % to 99 mol. % of the total moles of caprolactam and hexamethylenediamine adipate monomers.

3. The method of claim 1, wherein the caprolactam monomers are present in an amount of from 92 mol. % to 96 mol. % of the total moles of caprolactam and hexamethylenediamine adipate monomers.

4. The method of claim 1, where the polyamide copolymer is formed by a first step of blending caprolactam and an aqueous solution of AH salt under agitation at a temperature between 150° C. and 170° C., followed by a second step of polymerizing the mixture of caprolactam and hexamethylenediamine adipate in a continuous polymerization train at an elevated temperature above 170° C.

5. The method of claim 1, further comprising:
    extruding a polyethylene polymer to form a polyethylene film, and
    combining the polyamide film and polyethylene film to form a multilayer film.

6. The method of claim 1, wherein the polyamide copolymer has a crystallization temperature of 140° C. to 160° C.

7. The method of claim 1, wherein the polyamide copolymer has a melt point of 190° C. to 210° C.

8. The method of claim 1, wherein the polyamide copolymer has a puncture resistance of 55 in-lb$_f$ to 95 in-lb$_f$.

9. A blown film comprising a polyamide layer, the polyamide layer comprising a polyamide copolymer consisting of caprolactam and hexamethylenediamine adipate monomers, wherein the caprolactam monomers are present in an amount of from 85 mol. % to 99 mol. % of the total moles of caprolactam and hexamethylenediamine adipate monomers, the polyamide copolymer further comprising:
    an isothermal crystallization time, measured by Differential Scanning calorimetry (DSC) according to ASTM E2070, of between 4 minutes and 14 minutes; and
    a degree of randomness of between 0.95 and 1.25.

10. The blown film of claim 9, wherein the caprolactam monomers are present in an amount of from 90 mol. % to 99 mol. % of the total moles of caprolactam and hexamethylenediamine adipate monomers.

11. The blown film of claim 9, wherein the caprolactam monomers are present in an amount of from 92 mol. % to 96 mol. % of the total moles of caprolactam and hexamethylenediamine adipate monomers.

12. The blown film of claim 9, wherein the polyamide copolymer has a crystallization temperature of 140° C. to 170° C.

13. The blown film of claim 9, wherein the polyamide copolymer has a crystallization temperature of 140° C. to 160° C.

14. The blown film of claim 9, wherein the polyamide copolymer has a melt point of 190° C. to 210° C.

15. The blown film of claim 9, wherein the polyamide copolymer has an isothermal crystallization time of 1.25 min to 12 min at 170° C.

16. The blown film of claim 9, further comprising a polyethylene layer.

17. The blown film of claim 9, wherein the polyamide copolymer has a degree of randomness between 0.95 to 1.1.

18. The blown film of claim 9, wherein the polyamide copolymer has a puncture resistance of 55 in-lb$_f$ to 95 in-lb$_f$.

19. A polyamide copolymer consisting of caprolactam and hexamethylenediamine adipate monomers, wherein the caprolactam monomers are present in an amount of from 85 mol. % to 99 mol. % of the total moles of caprolactam and hexamethylenediamine adipate monomers, and wherein the copolymer has a melt point of 190° C. to 205° C., an isothermal crystallization time, measured by Differential Scanning calorimetry (DSC) according to ASTM E2070, of between 4 minutes and 14 minutes; and
    a degree of randomness of between 0.95 and 1.25.

20. The polyamide copolymer of claim 19, wherein the copolymer has a degree of randomness of 0.95 to 1.1.

21. The polyamide copolymer of claim 19, wherein the copolymer has a puncture resistance of 55 in-lb$_f$ to 95 in-lb$_f$.

* * * * *